June 13, 1944.  E. A. LUXENBERGER ET AL  2,351,529
SHAPING MOLD
Filed Feb. 16, 1940   3 Sheets-Sheet 1

INVENTORS
EUGENE A. LUXENBERGER
HERBERT C. ERICH
BY MARION M. CUNNINGHAM
ATTORNEYS

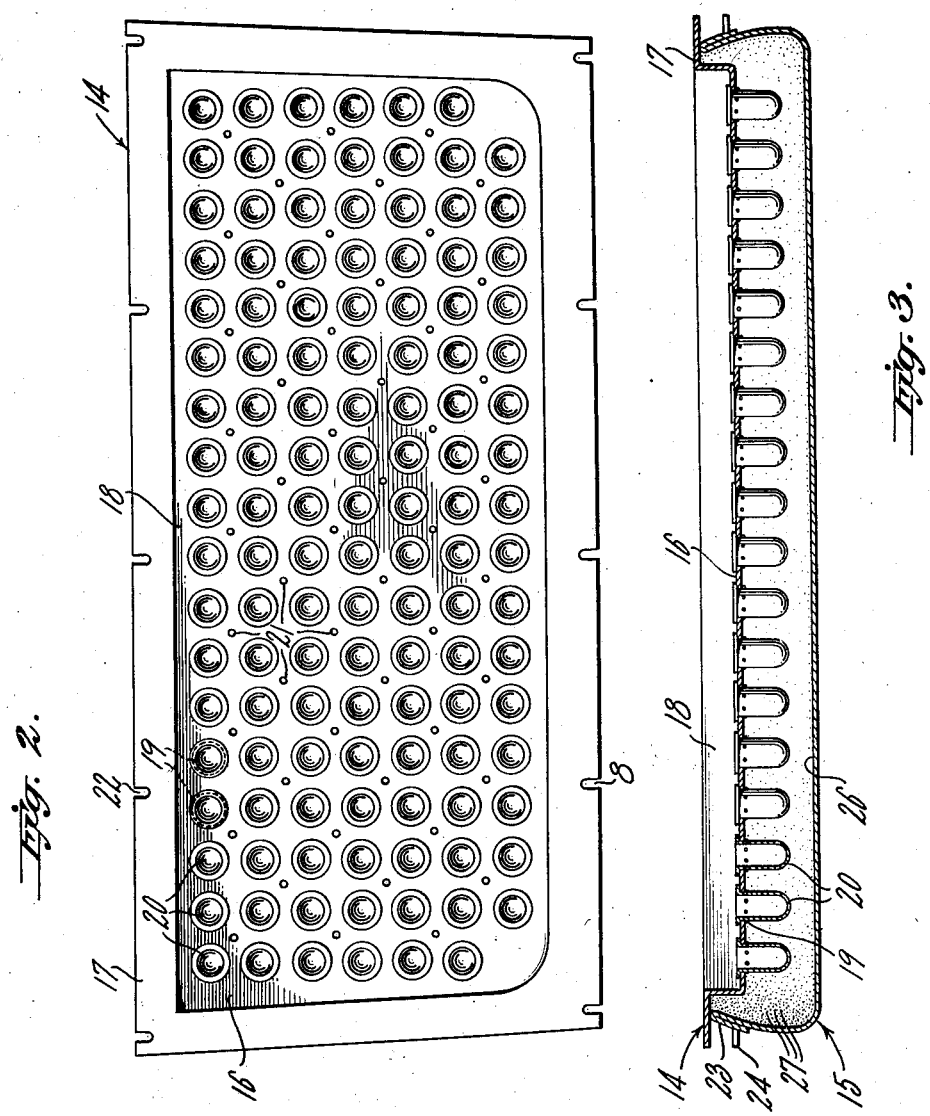

June 13, 1944. E. A. LUXENBERGER ET AL 2,351,529
SHAPING MOLD
Filed Feb. 16, 1940 3 Sheets-Sheet 3
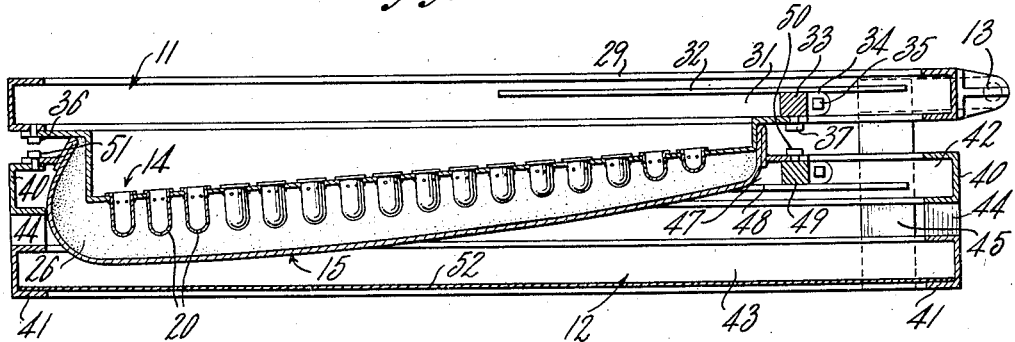
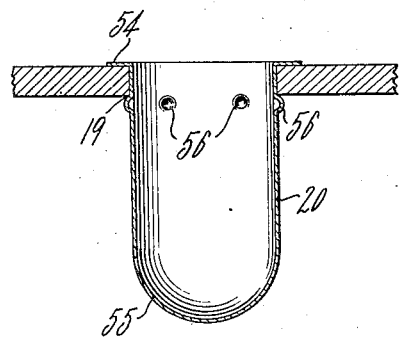
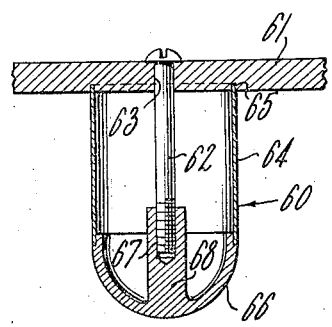
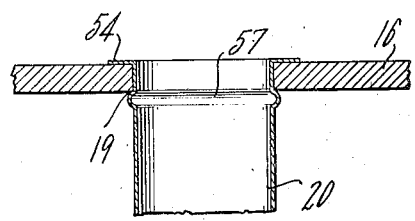
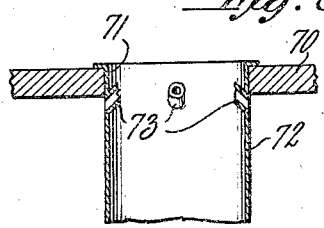
INVENTORS
EUGENE A. LUXENBERGER
HERBERT C. ERICH
BY MARION M. CUNNINGHAM
ATTORNEYS Patented June 13, 1944

2,351,529

UNITED STATES PATENT OFFICE 2,351,529

SHAPING MOLD

Eugene A. Luxenberger and Herbert C. Erich, Mishawaka, and Marion M. Cunningham, South Bend, Ind., assignors to United States Rubber Company, New York, N. Y., a corporation of New Jersey Application February 16, 1940, Serial No. 319,234

3 Claims. (Cl. 18—39)

This invention relates to molds and methods of making molds, and more particularly to molds for permanently shaping foamed rubber latex as, for example, during gelling and vulcanizing operations.

The mold according to this invention is particularly adapted to the formation of sponge rubber articles such as cushions, mattresses and the like, by depositing foamed or frothed liquid latex therein and subsequently coagulating and vulcanizing the latex foam on a commercial largescale basis of operation. In the operations of distributing foamed latex in a mold, and setting or gelling the latex in a shape determined by the interior configuration of the mold, and of vulcanizing the shaped unvulcanized but coagulated rubber article within the same mold, several peculiar problems arise which are not encountered when shaping moldable materials other than foamed latex or when operating with latex on a small laboratory scale as opposed to a large commercial scale. The optimum conditions for operating two-part molds on a commercial scale are: the foamed latex is poured into and distributed evenly throughout the lower half of the mold, the upper half of the mold then being placed in relation to the lower half so as to close the mold so that the shape of the latex article is determined; the latex then coagulates or gels to form an unvulcanized rubber article which partakes of the interior shape of the mold without shrinking and without breaking the bubbles within the foam structure; the coagulated latex article is then vulcanized under such conditions as to still retain the desired internal structural characteristics and exterior shape, and is finally stripped or otherwise removed from the mold. Molds heretofore employed in this or similar processes have not been of such construction as to maintain the necessary conditions enumerated above. For example, in the manufacture of cushions and mattresses, the rate of heat transfer from the exterior of the mold to the interior of the mold when operating on freshly gelled and shaped frothed latex was comparatively slow with vulcanizing molds in use prior to the present invention. Manufacture of such sponge rubber articles from latex on a large scale, for instance, on a scale commensurate with the rate of production in the automobile industry may be carried out with this invention.

Also when the latex foam was poured into the lower half of certain previous molds, air pockets were entrapped between the exterior surface of the latex mass and the interior surface of the mold, a condition which is likely to happen with latex foam of the usual characteristics due to the relatively high viscosity thereof and due to the spreading operations necessary to distribute the foam throughout the interior of the mold. These air pockets formed undesirable dents or cavities in the surface of the final article, in addition to the tendency of the entrapped air to enlarge the pockets during heating operations and consequently to unduly compress certain interior portions and thereby in certain instances to render the foam structure non-uniform. The mold of the present invention is preferably provided with a roughened interior surface for preventing or reducing the formation of air pockets in the surface of the rubber articles formed.

When the mold is closed and an excess of latex foam has been introduced into the lower half of the mold, provision must be made for allowing egress of excess latex foam from the lower half of the mold without unduly compressing the remaining liquid foam which would tend to extract the entrapped air therefrom and to raise the density thereof, thereby resulting in an inferior article. The mold frame of the present invention provides against this contingency by permitting gentle pressure to be employed while any excess latex foam may be eliminated from within the interior of the mold, a provision which is to be distinguished from the ordinary pressure mold used in dealing with dense liquids or viscous materials such as softened rubber.

The roughened surface on the interior of the mold reduces the tendency to form air pockets and produces an article the outside of which is fluid-pervious as contrasted with a solid thin film. In addition, the roughened surface exerts a gripping action on the exterior of the article while the article is being gelled and vulcanized, thereby assisting in the prevention of shrinkage during both the gelling and the vulcanizing stages. After vulcanizing has been completed the mold is opened by separating the mold sections and the article is stripped therefrom, at which time the mold is cooled again preparatory to the introduction of another batch of latex foam. The roughened interior surface of the mold also assists in dissipating heat from the walls of the mold, thereby accelerating the cooling thereof. The rapidity with which the mold of the present invention may be heated and cooled is of particular importance in large-scale commercial operations wherein it is desired to use a single mold as many times as possible within a predetermined manufacturing period.

Articles of the class which may be made by the present mold are generally characterized by a plurality of elongated cavities extending, sometimes entirely, but generally partway, therethrough. It is therefore necessary in producing such articles by pouring latex foam into a mold to provide a mold having projections which correspond with and produce the desired cavities. Various expedients have been attempted to produce molds which have the desired surface characteristics to form corresponding cavities in the articles. Previously such molds have been heavy, cumbersome, expensive and difficult of manufacture. In actual practice under present commercial conditions, the mold, according to the present invention, may be employed to produce up to thirty-five articles per manufacturing shift as compared with seven or eight articles producible by former molds during the same shift and with the same operations, this advantage being attributable primarily to the rapidity with which the present mold may be heated and cooled as contrasted with former molds which were not only slow in operation but which were cumbersome in handling.

In general, the mold according to the present invention comprises two thin shell-like mold members preferably composed of aluminum, one a female mold member having an interior surface especially adapted for close retention of moldable fluid without the interposition of air pockets, and the other a male mold member having the desired hollow protuberances for the formation of cavities extending within the article to be produced. In this specification the male mold member having the protuberances will be referred to as the upper member and the female as the lower since the foamed liquid is more commonly poured into the mold section which is unobstructed on its interior, thereby permitting of easier spreading of the foamed latex; although the relative positions of the protuberances may be reversed, the principal difference between the two procedures being the relative facility with which the compound may be distributed within the mold before closing the mold. The protuberances in the upper section are preferably composed of thin walled hollow shell-like tubes closed at the end which extends away from the base member supporting them, these tubes partaking of the shape of a thimble in a preferred embodiment, and having the desired number, size, shape and arrangement. Each tube is secured to the base portion of the mold member by any suitable desired permanent or removable connecting means so long as the means for holding the tube in place is of such construction that it does not interfere with the heat transferring properties of the mold member; however, the method described hereafter has been found particularly satisfactory. The interior surface of the lower mold member, which, in the preferred construction, constitutes a continuous surface in its general configuration, may be treated, as by sand-blasting, to roughen it so that small interconnecting ridges are provided thereon. These ridges accelerate heat dissipation from the exterior of the article within the mold, assist in retaining the exterior surface of the molded article in close contact with the mold, provide an air-pervious or "breathing" film on the exterior of the article, dissipate air from between the foamed fluid and the mold surface, and serve to retain the identity of the pore structure within the interior of the article. If desired, the upper or male member of the mold may also be treated so as to present a roughened surface to the material to be shaped, although it may be necessary to exercise some care in removing the mold from the sponge rubber article due to the greater adhesion between the mold surface and the sponge rubber surface caused by the roughening as contrasted with a smooth metallic surface.

Referring to the accompanying drawings, certain present preferred embodiments of the invention are illustrated, in which, Fig. 1 is a plan view of the mold assembly mounted in a frame or pallet which is in the open position;

Fig. 2 is a plan view of the upper or male mold member;

Fig. 3 is a longitudinal cross-section showing the upper and lower molds in closed position relative to each other, the frame being omitted;

Fig. 4 is a cross-sectional view taken as along the line 4—4 of Fig. 1 but showing the frame with the mold in closed position;

Fig. 5 is a cross-section of a protuberance of the upper mold member together with securing means;

Fig. 6 is a fragmentary cross-section similar to Fig. 5 showing alternative securing means;

Fig. 7 is a cross-section of a portion of an upper mold member with an alternative type of protuberance extending therefrom; and Fig. 8 is a fragmentary cross-section of an upper mold member provided with vent-holes.

Figure 1:
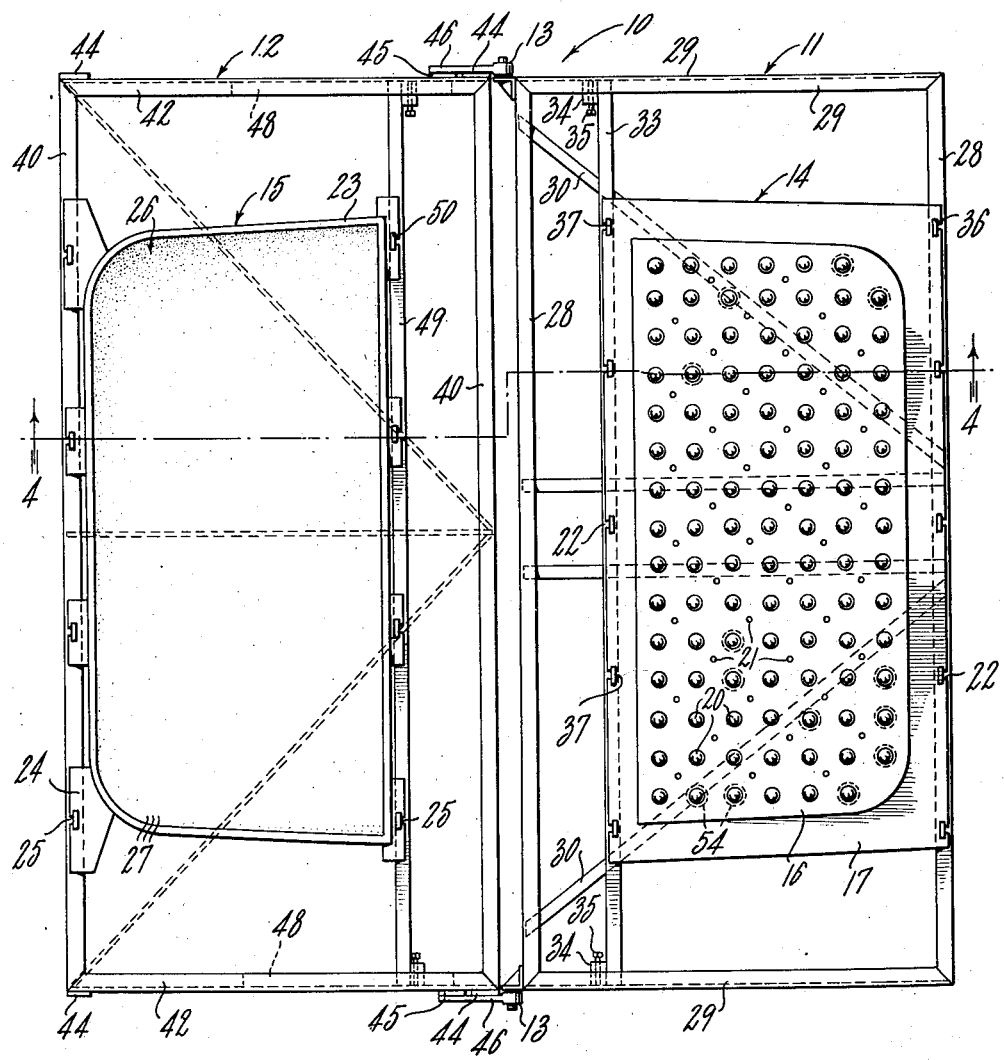

Referring to Figs. 1 and 4, a frame 10 comprises an upper frame section 11 and a lower frame section 12 the sections being pivotally connected for opening and closing by hinges 13. The upper frame section 11 supports an upper mold section 14 and the lower frame section 12 supports a lower mold section 15 so that when the frame is closed the mold sections will be closed in register with each other as shown in Fig. 4. Any other desired means may be employed for holding the mold sections in proper position, but the frame herein described has been found especially suitable due to its ease of manipulation, opening and closing, and adjustment.

Referring particularly to Fig. 2, the upper mold section 14 comprises a base element 16 having a flat flange 17 extending around a depressed portion 18 and which is provided with preferably circular apertures 19 through which protuberances or thimbles 20 extend. Vent-holes 21 traverse the base element 16 at intervals between the protuberances 20. The flange 17 is provided with notches 22 along its longer edges for the reception of anchoring means to secure the mold within the frame. Since the upper portion of the mold usually determines the shape of the lower surface of the article formed thereby, the depressed surface 18 may be flat or curved as desired, usually depending on the use to which the sponge rubber article is to be put.

The lower mold section 15 (see Fig. 3) comprises generally a shallow pan or receptacle although any desired shape may be provided. Lips 23 comprising the edges of the mold section 15 may be reinforced by an extra thickness of metal to support brackets 24 extending from the longer edges thereof. Notches 25 are provided in the brackets 24 to receive anchoring means. The general configuration and depth of the lower mold member as shown in the drawings is such that the upper mold member may extend thereinto so that there is a space between the closed ends of the thimbles 20 and the interior surface 26 of the lower member, although this arrangement may be varied to produce articles of virtually any desired shape or having virtually any depth and arrangement of openings therein. The interior surface 26 is roughened or sand-blasted to provide minute interconnecting channels surrounding minute projections 27.

Referring again to Figs. 1 and 4, the upper frame section 11 may be composed of frame members such as longitudinal channel irons 28 and lateral channel irons 29 secured, as by welding, in rectangular formation and braced by irons 30. Channels 31 (Fig. 4) extend interiorly along the channel irons 29 and are defined in part by guide fins 32 which allow adjustment of a mold anchoring iron 33 extending longitudinally of the frame section. Each end of the mold anchoring iron 33 is provided with a lug 34 through which a set screw 35 extends to be tightened against the inner face of the channel 31. The outer longitudinal channel iron 28 is provided with upstanding cleats 36 which are so spaced as to register with the notches 22 along one side of the mold section 14. The mold anchoring iron 33 is likewise provided with similar cleats 37 which engage the notches 22 along the opposite side of the mold section 14. When mounting the upper mold section 14 within the frame section 11 one edge of the flange 17 is rested on the top of the channel bar 28 and adjusted so that the cleats 36 engage the notches 22. The mold anchoring iron 33 is then slid along the channels 31 until the cleats 37 engage the notches 22 on the opposite side. The set screws 35 are then tightened against the inner faces of the channels 31, thus clamping the iron 33 in effective position. In this manner mold sections of different sizes, but all having their notches correspondingly arranged, may be interchanged within the frame by proper adjustment of the anchoring iron within each frame section.

In similar manner the lower mold section 15 is secured in the lower frame section 12 which comprises upper and lower longitudinal channel irons 40 and 41, respectively, and upper and lower lateral channel irons 42 and 43, respectively. Uprights 44 and 45 may be welded to secure the upper channel irons to the lower, and each upright 45 is elongated to hold a bracket 46 for the hinge 13. Channels 47 are provided in the lateral irons 42 by guide fins 48 which may be secured thereto by welding. A mold anchoring iron 49, having cleats 50 for engagement with the notches 25 on one row of brackets 24, may be adjusted and secured as described with reference to the upper frame section, the notches on the opposite row of fins being engaged by cleats 51 on the channel iron 40. The frame section 12 is of sufficient depth to accommodate the mold section 15, and is provided with a plate 52 secured as by welding to the lower part of the frame to form a drip pan.

Referring particularly to Fig. 5, the thimble 20, preferably of heat conductive material, such as aluminum, is provided with a flange 54 which is of sufficient size to prevent the entire thimble from passing through the aperture 19 when inserted therein. The wall of the thimble 20 may be entirely cylindrical before insertion into the aperture 19 of the base 16 except for the flange 54 and the closed end portion 55 which may be rounded. The thickness of the walls of the thimbles or protuberances is preferably less than 0.075 inch in order to effect rapid heat transfer. The interior diameter of the aperture 19 is substantially identical to, or slightly greater than, the exterior diameter of the thimble 20, and the depth of the thimble may be chosen according to the relative position which it is to occupy in the mold member as shown in Fig. 4. The present method of making the upper or male mold section, and particularly of anchoring the protuberances within the base in secure relationship has been found especially satisfactory as compared with former methods of producing or attaching blocks or other heavy projections on a mold section. The base 16 may be formed in the desired shape in well known manner as by cutting and welding operations and the holes or perforations 19 may be drilled at appropriate locations. The thimbles 20 are then inserted in the perforations 19 so that they hang loosely, after which they are secured in place. Fig. 5 shows humps 56 immediately below and in contact with the surface opposite that which the flange 54 abuts. These humps may be formed by any suitable mechanical expedient such as by inserting an expanding tool into the opening of the thimble and forcing expanding elements such as ball bearings against the interior wall to expand portions of the wall outwardly. Fig. 6 shows an alternative securing means for anchoring the thimble to the base comprising an annular projection 57 extending entirely around the circumference of the thimble immediately below the lower surface of the base 16 at the intersections thereof with the aperture 19. The annular projection may be formed by inserting an expanding tool into the open end of the thimble and rotating the tool.

Fig. 7 shows an alternative construction of a protuberance 60 attached to a mold base element 61 by a bolt 62 extending through a small hole 63 in the base. The thimble-shaped protuberance 60 includes a thin metallic cylindrical or otherwise shaped shell 64 preferably open at both ends one of which seats either flush against the surface of the base 61, if desired, or, as shown in the drawings, in a circular recess 65 formed or cut in the base surface. The other end of the shell 64 fits against a cap 66, preferably hemispherical in contour, which is internally threaded at 67 to accommodate the end of the bolt 62. The cap is thin-walled and has an internal projection 68 for the formation of the threads 67. The length of the shell 64 may be chosen according to the position which the assembly is to occupy; for example, if it is to operate as a protuberance on the right side of the frame as shown in Fig. 4, it may be short, or if it is to be placed on the left side of the frame, a longer shell may be provided for deeper projection into the lower mold member 26.

In Fig. 8, a mold base 70 is provided with hole 71 into which a thimble-like projection 72 has been forced in tight fitting relationship. Air vents 73 provided in the thimble, as by punching through the thin walls, are preferably located at the juncture between the exterior wall of the thimble and the lower surface of the base 70, since, on closing the mold, that juncture is the portion of the interior of the mold where air is most likely to be entrapped.

The lower or female mold section 15 may be shaped, if desired, similarly to the upper mold base 16, as by cutting and bending a sheet of aluminum or other rapid heat conductive material of the desired size and thickness which is preferably greater than the thickness of the protuberances. The necessary portions may be welded together to form the corners or other desired parts of the mold. The reinforcements at the lips 23 may be integral and folded over as shown in Fig. 3 or may be separate pieces welded to the main body of the mold section. After the desired shape has been attained, the interior of the mold section may be sand blasted or otherwise treated to produce the roughened surface having the desired characteristics.

The molds are preferably made of light weight rapid-heat-conductive material, such as aluminum, in thin cross-section, the base element 16 preferably having a gauge of the order of ¼ or ⅛ inch or less. In operation, when the lower mold section has been filled, the mold is closed and the protuberances project into the foam. The foam, which may contain delayed coagulating ingredients is then gelled, and is finally vulcanized. When a steam cure is used, considerable moisture collects on the upper surfaces of the upper mold section, so that the vent-holes 21 serve a double function both in allowing entrapped air to escape and in permitting the condensed moisture to dissipate into the pores of the article formed.

Although we have shown and described certain present preferred embodiments of our invention, it is to be understood that the invention may be otherwise practiced and embodied within the spirit thereof and within the scope of the appended claims.

Having thus described our invention what we claim and desire to protect by Letters Patent is:

1. In a shaping mold for setting and vulcanizing foamed latex, a mold section comprising a base of thin sheet material having a plurality of perforations therein, a thin-walled thimble secured in each of the perforations of said base, and a vent hole communicating between the exterior and the interior of each of said thimbles.

2. In a shaping mold for setting and vulcanizing foamed latex, a mold section comprising a base of thin sheet material having a plurality of perforations therein, a thin-walled thimble secured in each of the perforations of said base, and a vent hole communicating between the exterior and the interior of each of said thimbles, said hole being located substantially at the juncture between said thimble and said base.

3. A shaping mold for setting and vulcanizing foamed latex comprising in combination a female mold member open at its top and adapted to contain a predetermined quantity of latex, a complementary male mold member adapted to register with the female mold to form therewith a closed container, a plurality of thin-walled protuberances on the male mold adapted to dip into the latex when the molds are in register, said protuberances being closed at their inner ends and open to the outside of the mold at their outer ends and vents in the walls of the protuberances located substantially at the level of the latex in the female mold when said molds are in register and said predetermined quantity of latex is in the mold.

EUGENE A. LUXENBERGER.
HERBERT C. ERICH.
MARION M. CUNNINGHAM.